(12) United States Patent
Liao

(10) Patent No.: US 7,581,850 B2
(45) Date of Patent: Sep. 1, 2009

(54) LIGHT GUIDE PLATE AND BACKLIGHT MODULE USING THE SAME

(75) Inventor: Ming-Yi Liao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/453,960

(22) Filed: Jun. 15, 2006

(65) Prior Publication Data
US 2007/0035948 A1 Feb. 15, 2007

(30) Foreign Application Priority Data
Aug. 12, 2005 (CN) .................. 2005 1 0036591

(51) Int. Cl.
*F21V 5/00* (2006.01)
(52) U.S. Cl. .................. 362/245; 362/241; 362/330; 362/328; 362/615; 362/613; 362/612; 362/609; 362/29; 362/30; 362/242; 362/339; 362/244; 362/243
(58) Field of Classification Search ............... 362/245, 362/241, 330, 328, 29, 30, 223, 242, 243, 362/244, 339, 600, 609, 611, 612, 613, 615
See application file for complete search history.

(56) References Cited

U.S. PATENT DOCUMENTS 4,345,308 A * 8/1982 Mouyard et al. ............ 362/332
5,993,027 A * 11/1999 Yamamoto et al. .......... 362/294
6,139,163 A    10/2000 Satoh et al.
6,497,946 B1 * 12/2002 Kretman et al. .......... 428/317.9
6,843,582 B2 * 1/2005 Chang ..................... 362/240
6,995,815 B2 * 2/2006 Tsai ........................ 349/70
2007/0217226 A1 * 9/2007 Zhu et al. .................. 362/615

FOREIGN PATENT DOCUMENTS

| CN | 1497208 A | 5/2004 |
|---|---|---|
| CN | 1510482 A | 7/2004 |
| CN | 1512232 A | 7/2004 |
| CN | 1641440 A | 7/2005 |

* cited by examiner

*Primary Examiner*—Sandra L O'Shea
*Assistant Examiner*—Jessica L McMillan

(57) ABSTRACT

A backlight module (20) includes a light guide plate (23), a reflecting member (21) and a plurality of light source (22). The light guide plate has a light incidence surface (231) and a light-emitting surface (232) opposite to the light incidence surface. The reflecting member faces the light incidence surface of the light guide plate. The light sources are arranged between the reflecting member and the light guide plate. The light guide plate defines a plurality of hollow structures (25) therein corresponding to the light sources and has a plurality of microstructure units (27) defined on the light incidence surface corresponding to the light sources.

20 Claims, 4 Drawing Sheets

LIGHT GUIDE PLATE AND BACKLIGHT MODULE USING THE SAME

TECHNICAL FIELD

The present invention relates to light guide plates and backlight modules that use light guide plates, such backlight modules typically being incorporated into devices such as liquid crystal displays.

GENERAL BACKGROUND

In a liquid crystal display device, the liquid crystal is a substance that does not itself illuminate light. Instead, the liquid crystal relies on receiving light from a light source in order to display images and data. In a typical liquid crystal display device, a backlight module powered by electricity supplies the needed light.

FIG. 1 shows a typical backlight module 10. The backlight module 10 includes a reflecting sheet 11, a plurality of light sources 12 for emitting light rays, a guide plate 13, and an optical sheet 14. The light sources 12 are disposed between the reflecting sheet 11 and the guide plate 13. The guide plate 13 has a light incident surface 131 and a light-emitting surface 132 opposite to the light incident surface 131. Light rays emitting from the light sources 12 transmit into the guide plate 13 from the light incident surface 131 and then transmit out from the light-emitting surface 132, so as to improve the optical uniformity of the light rays. The optical sheet 14 is used to provide a more improved luminance and a better uniform brightness distribution. The optical sheet 14 can typically be one of an upper diffuser, a brightness enhancement film, and a lower diffuser. Partial light rays emitting from the light sources 12 transmit downwardly to the reflecting sheet 11, and then the reflecting sheet 11 reflects the light rays into the guide plate 13 so that the light rays can be utilized more effectively.

It is seen that, in the backlight module 10, most of the light rays emitting from the light sources 12 transmit in two general directions. In a first direction, the light rays emitting from light sources 12 transmit directly to the guide plate 13, and in a second direction, the light rays from light sources 12 transmit toward the reflecting sheet 11 and then reflected to the guide plate 13. The luminance of the light rays is in an inverse ratio to the traveled distance of light rays, thus, in the first direction, an area of the guide plate 13 closely adjacent to each light source 12 has a higher luminance than other areas further adjacent to each light source 12. In the second direction, most light rays reflected by the reflecting sheet 14 are reflected against the light source 12, thus, the reflecting light rays are mostly obstructed by the light source 12. Therefore, the light rays utilization is inefficient and the backlight module 10 is non-uniform. In order to improve the optical uniformity of the light rays, the distance between the light sources 12 and the guide plate 13 has to be increased, as a result, the size of the backlight module 10 is also increased and a liquid crystal display device using the backlight module 10 will also have a large size.

However, there is ongoing demand for backlight modules to provide an even more improved luminance and uniformity of illumination. A new light guide plate for a backlight module which can meet this demand is also desired.

SUMMARY

A light guide plate according to a preferred embodiment of the invention includes a light incidence surface, a light-emitting surface opposite to the light incidence surface, a plurality of hollow structures defined therein, and a plurality of microstructure units defined adjacent to the light incidence surface.

A backlight module according to another preferred embodiment of the invention includes a light guide plate, a reflecting member and a plurality of light sources. The light guide plate has a light incidence surface and a light-emitting surface opposite to the light incidence surface. The reflecting member faces the light incidence surface of the light guide plate. The light sources are arranged between the reflecting member and the light guide plate. The light guide plate defines a plurality of hollow structures therein corresponding to the light sources and has a plurality of microstructure units defined on the light incidence surface corresponding to the light sources.

Other advantages and novel features will become more apparent in the following detailed description when taken in conjunction with the accompanying drawings, in which:

DETAILED DESCRIPTION OF THE PREFERRED EMBODIMENTS

Figure 1:
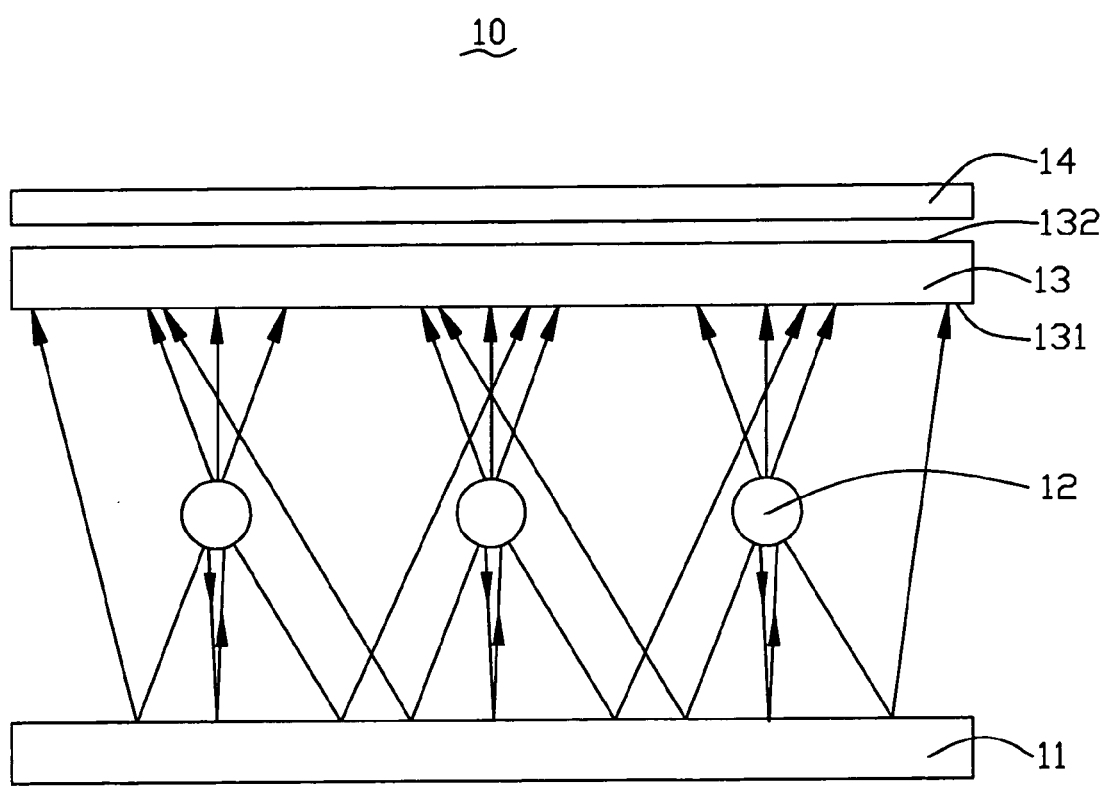
FIG. 1 is a schematic, cross-sectional side view of a conventional backlight module.
Figure 2:
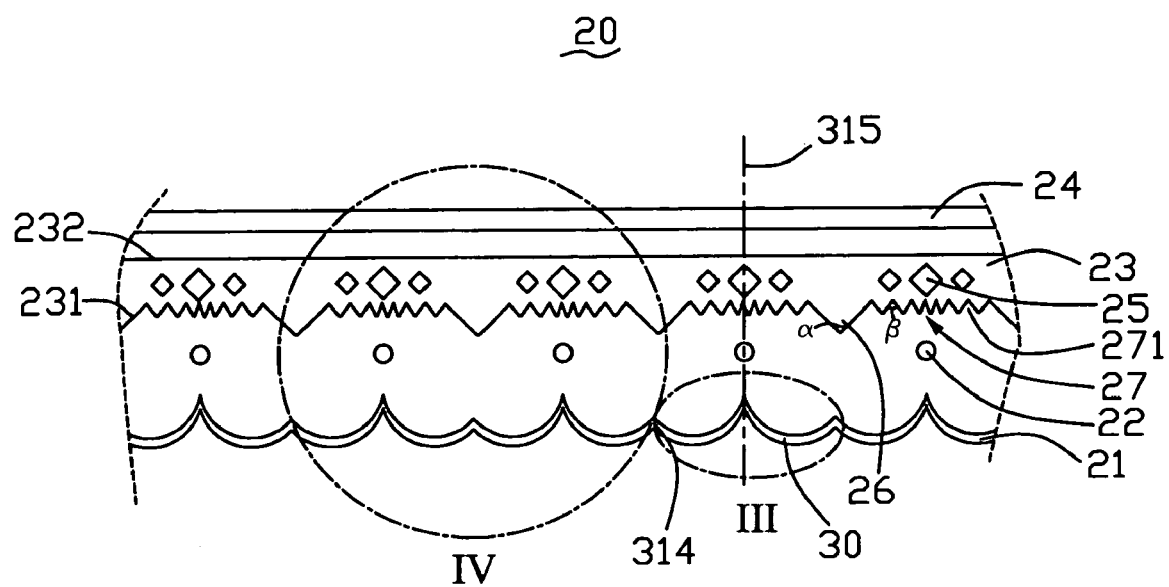
FIG. 2 is a schematic, partially cross-sectional side view of a backlight module according to a preferred embodiment of the present invention.

Referring to FIG. 2, a backlight module 20 of a display device, especially a liquid crystal display device, extending along a display side of the display device according to the first embodiment of the invention includes a plate-like light guide member 23, a reflecting member 21, and a plurality of light sources 22. The light sources 22 are disposed between the reflecting member 21 and the light guide plate 23. The light guide plate 23 includes a light incidence surface 231, and a light-emitting surface 232 opposite to the light incidence surface 231. The reflecting member 21 is spaced apart from the light guide plate 23 and faces the light incidence surface 231 of the light guide plate 23.

The light guide plate 23 is made from transparent resin materials selected from a group comprising of polycarbonate (PC), polymethyl methacrylate (PMMA), and polyurethane (PU). The light guide plate 23 defines a plurality of hollow structures 25 therein and has a plurality of microstructure units 27 defined on the light incidence surface 231 corresponding to the light sources 22.

Each of the hollow structures 25 corresponds to one of the light sources 22 and includes a plurality of polygonal hollow structures. A cross-section of each polygonal hollow structure is a triangle or a quadrangle. In the first embodiment, each hollow structure 25 includes three polygonal hollow structures.

Each of microstructure units 27 includes a plurality of microstructures 271 defined in the light incidence surface 231 facing one of the light sources 22. The microstructures 271 in an area closer to the light source 22 are denser than in other areas further to one particular light source 22. Each of the microstructure units 27 is connected to its adjacent microstructure unit 27 by a long prism shaped structure 26. A cross-section of the long prism shaped structure has a protruding peak having a vertex angle α configured to be in a range from about 80 degrees to about 175 degrees. The microstructures 271 of each microstructure unit 27 have a plurality of valleys. Each cross-section of the valley has a vertex angle β configured to be in a range of about 60 degrees to 150 degrees so that light rays can be uniformly refracted to an area having low luminance. The vertex angles β of the microstructures 271 progressively increase along directions from a microstructure 271 above the light source 27 toward two ends of each microstructure unit 27. Therefore, a vertex angles β of the microstructures 271 closer to the light source 27 is smaller than a vertex angle further than the light source 27. Thus, the light refraction is enhanced so as to further improve the uniformity of output light rays. The light incidence angle will be changed if the vertex angle β is changed.

A optical film 24 is disposed above the light-emitting surface 232 of the light guide plate 23 to provide a more improved luminance and a better uniform brightness distribution.

Each light source 22 is a cold cathode fluorescent lamp (CCFL) or an external electrode fluorescent Lamp (EEFL).

Figure 3:
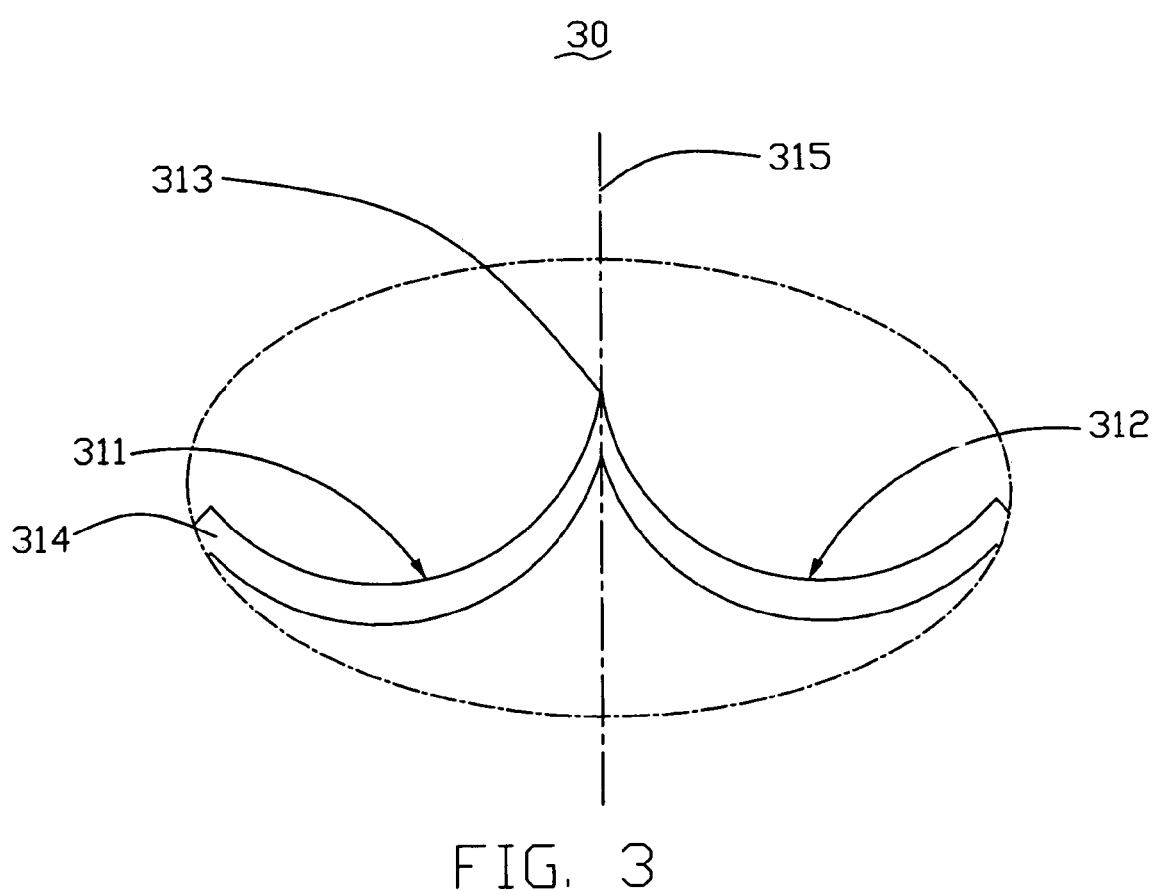
FIG. 3 is an enlarged view of a similar circled portion III shown in FIG. 2.

Referring to FIG. 3, the reflecting member 21 includes a plurality of reflecting units 30 for reflecting light rays emitted from the light sources 22 to the light incidence surface 231 of the guide plate 2.

Each reflecting unit 30 includes a first arc surface 311, a second arc surface 312, and a peak portion 313 for connecting the first arc surface 311 and the second arc surface 312. The first arc surface 311 and the second arc surface 312 is symmetrical relative to a line 315 perpendicular to the light-emitting surface 232 passing through the peak portion 313. The line 315 is used to indicate a projective area of each light source 22 upon the light guide plate 23 and the reflecting member 21 respectively. Each reflecting unit 30 is connected with its adjacent reflecting unit 30 by a connecting portion 314. Each peak portion 313 faces towards one of the light sources 22 and each connecting portion 314 faces one of the long prism shaped structures 26. The peak portion 313 is closer to the light incidence surface 231 of the guide plate 2 than the connecting portion 314. The curvature ratios of the first arc surface 311 and the second arc surface 312 may be a series of values changed in succession and may also be a fixed value.

Figure 4:
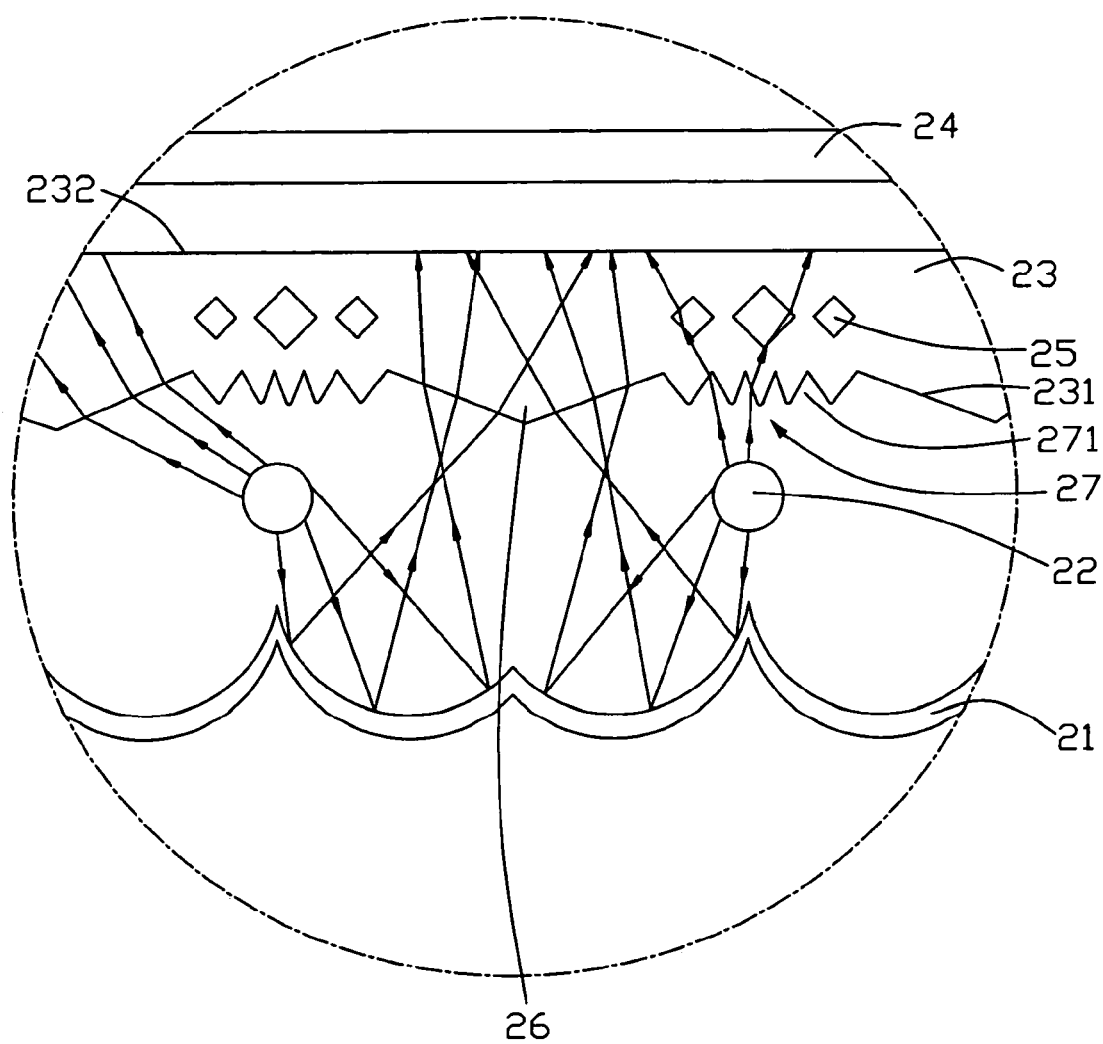
FIG. 4 is an a enlarged view of a circled portion IV shown in FIG. 2, and showing light rays reflected and refracted in the backlight module of FIG. 2.

Referring to FIG. 4, when the backlight module 20 is in operation, some light rays emitted from the light source 22 directly pass through the light incidence surface 21 and enter the light guide plate 23. The other light rays from light sources 12 transmit towards the reflecting units 30 of reflecting member 21 and then reflected into the guide plate 13 by the first arc surface 311 or second arc surface 312. Thus, the light rays reflected by the reflecting member 21 are not easily obstructed by the light source 12. All light rays are reflected and refracted in the light guide plate 23 before the light-emitting surface 232 outputs the light rays. When light rays are within the light guide plate 20, the hollow structures 25 and the microstructures 271 reflect and refract the light rays, so the light intensity is not centralized in the area closer to the light source 12. Therefore, the surface light rays output from the light-emitting surface 232 have a relatively high brightness and an improved uniformity.

In addition, the inventive backlight module 20 is not limited to the embodiments described above. For example, the microstructure 271 may generally be trapezoidal, trapezium-shaped, arcuate, arch-shaped, and so on. The vertex angle or vertex angles defined by the microstructure 271 may be configured according to the brightness and other characteristics of the light source 22 used.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A backlight module comprising:
   a light guide plate having a light incidence surface and a light-emitting surface opposite to the light incidence surface;
   a reflecting member spaced apart from the light guide plate and facing the light incidence surface; and
   a plurality of light sources arranged between the reflecting member and the light guide plate;
   wherein the light guide plate defines a plurality of hollow structures therein, each of the hollow structures corresponds to one of the light sources, a plurality of microstructure units are defined on the light incidence surface, and each of the microstructure units is over the corresponding light source.

2. The backlight module according to claim 1, wherein each reflecting member includes a plurality of reflecting units and each reflecting unit includes a first arc surface, a second arc surface, and a peak portion for connecting the first arc surface and the second arc surface.

3. The backlight module according to claim 2, wherein curvature ratios of the first arc surface and the second arc surface are a series of values changed in succession.

4. The backlight module according to claim 2, wherein the first arc surface and the second arc surface is symmetrical relative to a line perpendicular to the light emitting surface and passing through the peak portion, each reflecting unit is connected to its adjacent reflecting unit by a connecting portion, and the peak portion is closer to the light incidence surface of the guide plate than the connecting portion.

5. The backlight module according to claim 4, wherein each microstructure unit has a plurality of microstructures defined in the light incidence surface and at least one of the microstructures facing one of the light sources.

6. The backlight module according to claim 5, wherein the microstructures have plurality of valleys and each cross-section of the valley has a vertex angle configured to be in a range of about 60 degrees to 150 degrees.

7. The backlight module according to claim 6, wherein the vertex angles of the microstructures progressively increase along directions from a microstructure above the light source toward two ends of each microstructure unit.

8. The backlight module according to claim 5, wherein each of the microstructure units is connected to its adjacent microstructure unit by a long prism shaped structure, and the long prism shaped structure faces the peak portion of the reflecting member.

9. The backlight module according to claim 8, wherein each cross-section of the long prism shaped structure has a protruding peak having a vertex angle α configured to be in a range from about 80 degrees to about 175 degrees.

10. The backlight module according to claim 1, wherein each of the hollow structures comprises at least one polygonal hollow structure.

11. The backlight module according to claim 10, wherein each of the polygonal hollow structures has a quadrangle cross-section or a triangular cross-section.

12. The backlight module according to claim 1, wherein each light source is selected from a group consisting of a cold cathode fluorescent lamp and an external electrode fluorescent lamp.

13. The backlight module according to claim 1, wherein a material of the light guide plate is selected from a group consisting of polycarbonate (PC), polymethyl methacrylate (PMMA), and polyurethane (PU).

14. A light guide plate comprising:
a light incidence surface;
a light-emitting surface opposite to the light incidence surface;
a plurality of hollow structures defined in the light guide plate; and
a plurality of microstructure units defined adjacent to the light incidence surface;
wherein each of the hollow structure corresponds to each of the microstructure units.

15. The light guide plate according to claim 14, wherein each of the microstructure units is connected to its adjacent microstructure unit by a long prism shaped structure.

16. The light guide plate according to claim 15, wherein each cross-section of the long prism shaped structure has a vertex angle configured to be in a range from about 80 degrees to about 175 degrees.

17. The light guide plate according to claim 14, wherein each microstructure unit has plurality of valleys, and a cross-section of each valley has a vertex angle configured to be in a range of about 60 degrees to 150 degrees.

18. The light guide plate according to claim 14, wherein each of the hollow structures comprises at least one polygonal hollow structure, and each of the at least one polygonal hollow structure has a quadrangle cross-section or a triangular cross-section.

19. A display device comprising:
a light source installable beside a display side of said display device to provide light to said display side for display; and
a light guide member of said display device extending along said display side of said display device and located between said display side and said light source to accept said light from said light source and further transmit said light toward said display side, said light guide member comprising a hollow structure formed inside said light guide member and around a projective area of said light source upon said light guide member to create void inside said light guide member for enhancing uniformity of said transmitted light in said light guide member, said hollow structure arranged discontinuously inside said light guide member and distributed symmetrically to said projective area.

20. The display device according to claim 19, further comprising a reflecting member placed beside said light source opposite to said light guide member, said reflecting member comprising at least two of reflecting units arranged symmetrically to another projective area of said light source upon said reflecting member, and each of said at least two of reflecting units shaped to reflect said light from said light source along a direction without passing through said light source.

* * * * *